May 17, 1932.  A. HORNE  1,859,142
SINGLETREE
Filed May 19, 1931
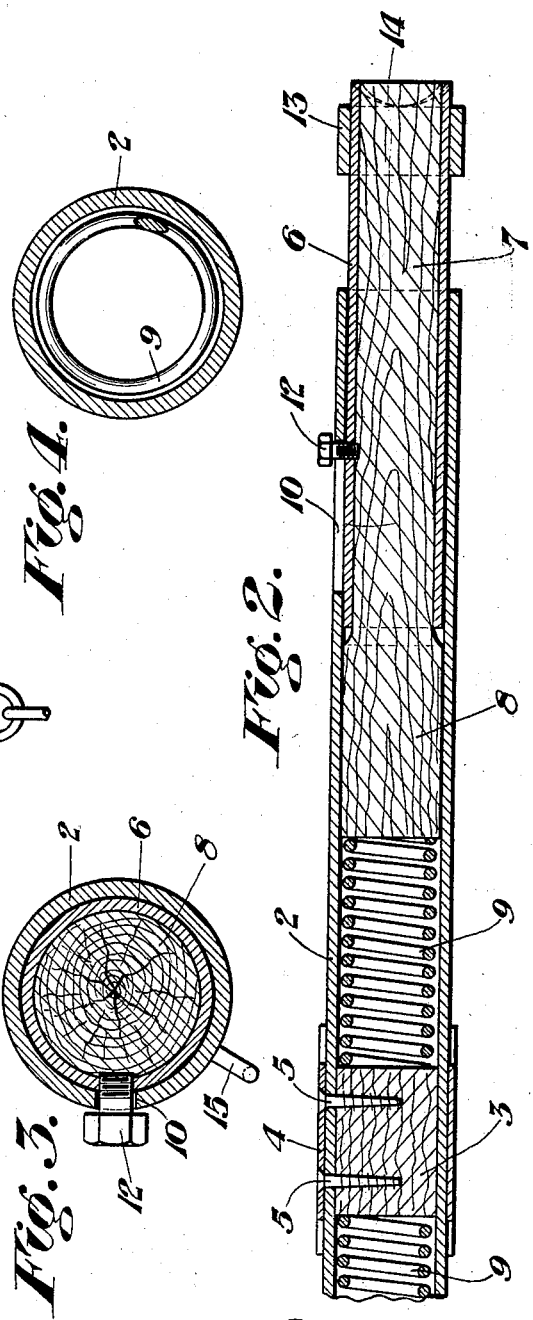
Inventor:
ANDREW HORNE,
by: Usina & Raubri
his Attorneys.

Patented May 17, 1932

1,859,142

UNITED STATES PATENT OFFICE

ANDREW HORNE, OF UNIONTOWN, PENNSYLVANIA

SINGLETREE

Application filed May 19, 1931. Serial No. 538,571.

My invention relates to singletrees, and particularly to an improved singletree for use in the cramped quarters prevailing in coal mines and the like.

One of my objects is to provide a singletree which will give upon striking an obstruction, a mine tunnel shoring post for instance, so that there will be little or no danger of damaging or displacing this obstruction. I also intend to provide a singletree of a generally novel construction.

In the drawings:

Figure 1 is a plan view of an example of a singletree constructed in accordance with my invention.

Figure 2 is a longitudinal cross section of the right hand portion of the singletree shown in Figure 1.

Figure 3 is a cross section on the line III—III of Figure 1.

Figure 4 is a cross section on the line IV—IV of Figure 1.

Referring to these drawings, there is shown a tubular body 2 containing a wooden plug 3 at its center. At this point a draft connection 4 is fixed to the body's outside by screws 5, which pass thru apertures therein to engage the plug 3. Angular ended tubular extensions 6 encompassing wooden beams 7, which in each instance extend beyond one end of these extensions in enlarged proportions to form heads 8, are fitted for sliding movement in the ends of the body 2. The heads 8 are positioned innermost, and springs 9 bear against them to resiliently urge the extensions 6 outward from the body 2.

The body 2 has longitudinal slots 10 near its ends, studs 12 being inserted therethru and engaged in the extensions 6, thus limiting the sliding movement of the latter. Trace connections 13 are fixed to the ends of the extensions 6, the angular ends of these extensions projecting slightly therebeyond to form wedge or cam surfaces 14. To keep the singletree away from the animal's heels when not pulling, U-bars 15 may be fixed near the ends of the body 2. These U-bars are adapted to receive straps suspended from the breeching of the animal's harness.

A singletree constructed as described is particularly useful in connection with mine cars. In mine tunnels, shoring posts and the like frequently are in a position where they may be struck by passing carts, and it sometimes happens that the singletrees connecting the animals to these carts become engaged behind one of these posts and pull it down. When using my invention, the traces connecting the animal to the ends of the singletree act as cam surfaces when passing close to a post, so that the extensions of the singletree may be pushed inward to clear this obstruction. The angular ends of these extensions also act as cams to insure compensation of the singletree's length, so that it may accommodate itself to close quarters whenever encountered.

Although I have shown and described a specific form of my invention in accordance with the patent statutes, I do not intend to limit the breadth of my invention thereto, the appended claim defining the true scope of my invention.

I claim:

A singletree comprising a tubular body having longitudinal slots near its ends, a plug mounted in said tubular body in the center thereof, a draft connection fixed to said body by elements passing through said body and into said plug, said plug being substantially coextensive with said draft connection and serving to strengthen the central portion of said body to which said draft connection is fixed, angularly ended tubular extensions, beams encompassed by said extensions and extending, in each instance, beyond one end thereof in enlarged proportions, said extensions and beams being fitted in the end of said tubular body with the enlarged ends of the beams innermost, springs in said body on each side of said plug and contacting with the ends of said beams, studs inserted through the slots in said body and engaging said extensions to limit the movement of said extensions relative to said body, and trace connections fitted to said extensions adjacent their outermost ends and inward from said angularly shaped end portions so as not to interfere with the wedge or cam action of such surfaces.

In testimony whereof, I have hereunto set my hand.

ANDREW (X) HORNE.
his mark